Patented Sept. 1, 1936

2,053,041

UNITED STATES PATENT OFFICE 2,053,041

DYESTUFF MIXTURE

Joachim Mueller, Ludwigshafen-on-the-Rhine, Germany, assignor to General Aniline Works, Inc., New York, N. Y., a corporation of Delaware No Drawing. Application January 21, 1935, Serial No. 2,842. In Germany January 27, 1934

10 Claims. (Cl. 8—6)

The present invention relates to mixtures of dyestuffs.

It is already known that in many cases dyestuffs are employed not alone but in mixtures with other dyestuffs. It had been observed that the fastness properties of such mixtures of dyestuffs are frequently not so valuable as could be expected with regard to the fastness properties of the single dyestuffs present in the mixture. Quite to the contrary it occurs in most cases that dyeings obtained for example by employing mixtures of dyestuffs having a relatively little fastness with dyestuffs of great fastness when exposed to light, to the atmosphere and to other influences show an unfavorable behaviour because the dyestuff having the better fastness properties is destroyed so that only the shade of the less valuable dyestuff remains. In other cases, it occurs that the dyestuff having a relatively little fastness is destroyed so that the resulting shade of dyeing approximates the shade of the dyestuff having the better fastness. Besides, even mixtures of dyestuffs having practically the same good fastness properties show a remarkable change of shade due to the fact that the presence of the one dyestuff favors the destruction of the other dyestuff present in the mixture. In each case, a considerable change of shade takes place.

I have now found that dyestuff mixtures in which at least one dyestuff of the azabenzanthrone series is present which contains at least one acridine ring beside the azabenzanthrone part of the molecule, not only, in contrast to other dyestuff mixtures yielding the same shade, do not show the said disadvantages but also are distinguished by an especially favorable behaviour upon exposure to light, to the atmosphere and to other influences.

Dyestuffs of the azabenzanthrone series of the said kind suitable for the purpose of the present invention are, for example, described in the U. S. invention Ser. No. 663,648 and in the British application specification No. 421,264. Substitution products of these dyestuffs, as for example their derivatives containing halogen atoms or alkyl, alkoxy, amino or acyl amino groups, may also be employed with the same result. As the other components of the dyestuff mixtures not only vat dyestuffs but also other dyestuffs, as for example azo dyestuffs, dyestuffs suitable for dyeing wool, leuco esters of vat dyestuffs, basic dyestuffs or substantive dyestuffs may be employed.

If dyestuff mixtures consisting wholly of vat dyestuffs are employed the dyestuffs are mixed together before their use and then vatted in the usual manner. It is also possible to mix the dyestuffs in the form of their vats. If beside vat dyestuffs other dyestuffs which are not injured by reducing agents are present in the mixture the vat dyestuffs can be vatted in the presence of the said other dyestuffs. If dyestuffs are present in the mixture which are injured by reducing agents one can proceed by first dyeing the fabric to be dyed with the desired vat dyestuffs and then dyeing it in a second operation with any desired other dyestuffs as for example with acid, basic or substantive dyestuffs or development dyestuffs. In cases when the components of the development dyestuffs are not affected by the action of the ingredients of the vat they may be brought on to the fabrics together with the vat dyestuffs, the dyeings then being developed. Instead of the vat dyestuffs their stable leuco compounds as for example their sulfuric acid esters may be employed. In this manner vegetable as well as animal fibres may be dyed, shades of excellent fastness properties being obtained. Even when employing relatively small amounts of the said vat dyestuffs of the azabenzanthrone series as for example 10 per cent thereof dyeings are obtained the fastness properties of which are remarkably better than it could be expected regarding the fastness properties of the components. This effect is especially evident if mixtures are employed which contain at least 20 per cent of the said vat dyestuffs of the azabenzanthrone series.

The following examples will further illustrate the nature of this invention but the invention is not restricted to these examples. The parts are by weight.

*Example 1*

5 parts of 8-azabenzanthrone-alpha-aminoanthraquinone are mixed with 10 parts of the dyestuff corresponding to the formula:

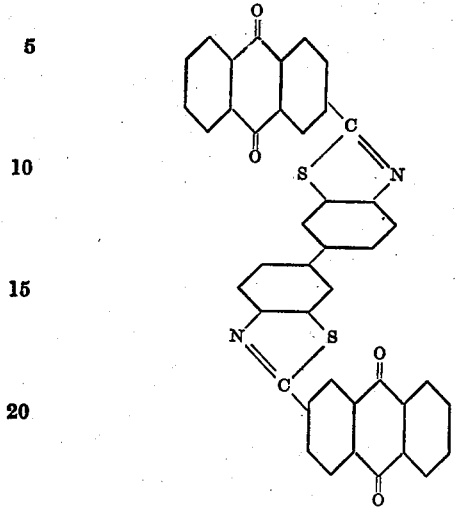

The mixture is introduced into 10000 parts of water and 50 parts of sodium hydroxide and 15 parts of sodium hydrosulfite are added thereto. 500 parts of cotton are then treated with the vat thus obtained at 60° C. for one hour. The cotton is then washed with water and exposed to the air. When the oxidation is completed, the cotton is soaped in the usual manner. The dyeing thus obtained shows a beautiful green shade of a high degree of fastness to light and the atmosphere.

Instead of the said azabenzanthrone dyestuff its dichloro, dibromo or its alkyl derivatives may be employed. Furthermore, the corresponding dyestuffs obtainable from 5- or Bz3-azabenzanthrone may be used. If desired the proportions of the two dyestuffs may be varied within wide limits, dyeings of excellent fastness always being obtained.

Instead of the dyestuff indicated by the formula as above, the yellow vat dyestuff obtainable according to the U. S. Patent No. 1,748,240 corresponding to the formula

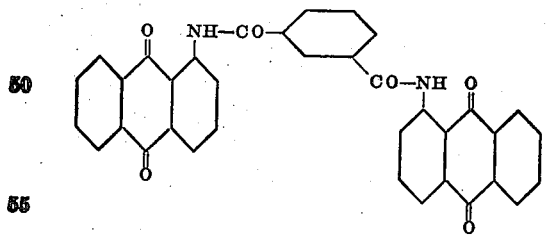

or to the British specification No. 231,532, the formula

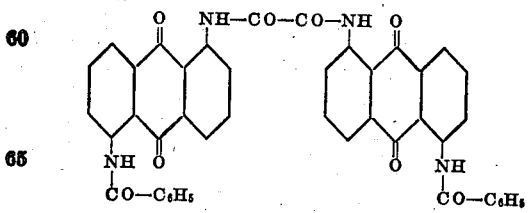

or the red vat dyestuff according to the German Patent No. 239,094 corresponding to the formula

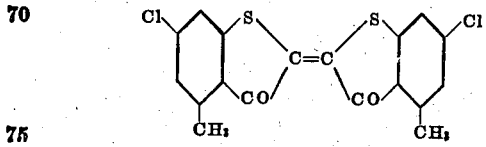

or Indanthrene Golden Orange G (Schultz Farbstoff-Tabellen, 7th edition, No. 1245) or Brilliant Indigo B. A. S. F. 4B (ibid., No. 1314) or Indanthrene Brilliant Violet BBK (ibid, No. 1222) or Hydrone Blue R (ibid, No 1111) or Indanthrene Olive R (ibid, No. 1224) may be employed.

The mixing of the dyestuffs may also first take place in the vat. Furthermore the corresponding stable derivatives of the leuco compounds of the said vat dyestuffs, as for example their leuco sulfuric esters and similar compounds, may be mixed before employment or in the dyebath, the dyeing being carried out in the usual manner.

It is is desired to prepare a mixed dyeing while employing one of the said vat dyestuffs of the azabenzanthrone series and a dyestuff sensitive to reducing agents, as for example a substantive dyestuff, it is preferable to proceed by first dyeing the fabric in the vat with the vat dyestuff, the fabric then being dyed in a second bath with the substantive dyestuff. The resulting dyeing is distinguished by a very good fastness to light.

*Example 2*

Cotton is dyed in the usual manner with the vat dyestuff of the azabenzanthrone series employed in Example 1 and the resulting dyeing is over-dyed with a basic dyestuff as for example Auramine O (ibid, No. 752) or the yellow azo dyestuff derived from diazotized dehydrothiotoluidine sulfonic carboxylic acid and aceto-acetic acid anilide. Dyeings are obtained which are distinguished by a very good fastness to light.

If it is desired to over-dye with a developer dyestuff, the resulting dyeing is slop-padded with a suitable coupling component, as for example di-(acetoacetyl)-tolidide, the dyeing being developed in the usual manner, as for example by treatment with a solution of diazotized orthochloraniline.

*Example 3*

5 parts of 8-azabenzanthrone-alpha-aminoanthraquinone are mixed with 7 parts of anthraquinone diphenyl thiazole corresponding to the formula:

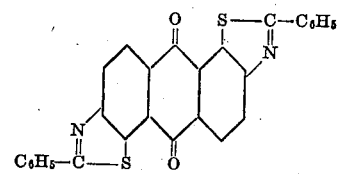

The mixture is introduced into 10000 parts of water and 50 parts of sodium hydroxide and 15 parts of sodium hydrosulfite are added thereto. 500 parts of cotton are then treated with the vat thus obtained at 60° C. for one hour. The cotton is then washed with water and exposed to the air. When the oxidation is completed, the cotton is soaped in the usual manner. The dyeing thus obtained shows a beautiful green shade of a high degree of fastness to light and the atmosphere.

Instead of the said azabenzanthrone dyestuff its dichloro, dibromo or its alkyl derivatives may be employed. Furthermore, the corresponding dyestuffs obtainable from 5- or Bz3-azabenzanthrone may be used. If desired the proportions of the two dyestuffs may be varied within wide limits, dyeings of excellent fastness always being obtained.

Instead of the dyestuff indicated by the formula as above, the dyestuffs mentioned in the third paragraph of Example 1 may be employed.

Example 4

3 parts of 8-azabenzanthrone-alpha-amino-anthraquinone are mixed with 8 parts of the dyestuff corresponding to the formula:

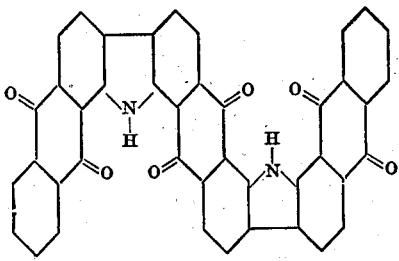

The mixture is introduced into 10000 parts of water and 50 parts of sodium hydroxide and 15 parts of sodium hydrosulfite are added thereto. 500 parts of cotton are then treated with the vat thus obtained at 60° C. for one hour. The cotton is then washed with water and exposed to the air. When the oxidation is completed, the cotton is soaped in the usual manner. The dyeing thus obtained shows a beautiful green shade of a high degree of fastness to light and the atmosphere.

Instead of the said azabenzanthrone dyestuff its dichloro, dibromo or its alkyl derivatives may be employed. Furthermore, the corresponding dyestuffs obtainable from 5- or Bz3-azabenzanthrone may be used. If desired the proportions of the two dyestuffs may be varied within wide limits, dyeings of excellent fastness always being obtained.

Instead of the dyestuff indicated by the formula as above, the dyestuffs mentioned in the third paragraph of Example 1 may be employed.

Example 5

20 parts of the sodium salt of the sulfuric acid ester of leuco-8-azabenzanthrone-alpha-amino-anthraquinone are mixed with 10 parts of the sodium salt of the sulfuric acid ester of leuco-$\beta,\beta$-dibromdibenzpyrenequinone. The said mixture is then dissolved in 1000 parts of water. Into the solution there are introduced 30 parts of cotton while adding 10 parts of sodium nitrite and 50 parts of anhydrous sodium sulfate. After 45 minutes, the cotton is squeezed and introduced into a solution of 35 parts of 96 per cent sulfuric acid in 1000 parts of water. There is obtained a yellowish olive-green dyeing of very high fastness to light and the atmosphere.

The following table contains a number of dyestuff mixtures in order to further illustrate the present invention. The parts (by weight) of the dyestuffs mentioned are calculated on 10000 parts of the dyebath to be used.

| Dyestuff of the azabenzanthrone series | Other dyestuffs |
| --- | --- |
| 2 parts of 8-azabenzanthrone-alpha-aminoanthraquinone. | 6 parts of the yellow dyestuff obtainable according to the 2nd paragraph of Example 1 of the German Patent No. 251,350. |
| 1.8 parts of Bz3-azabenzanthrone-alpha-aminoanthraquinone. | 6 parts of the yellow dyestuff obtainable according to the 2nd paragraph of Example 1 of the German Patent No. 251,350. |
| 1.2 parts of dichlor-8-azabenzanthrone-alpha-aminoanthraquinone. | 3 parts of anthraquinonediphenyldithiazole. |
| 0.32 part of 8-azabenzanthrone-alpha-aminoanthraquinone. | 1.2 parts of 5.5'-di(benzoylamino)-1.1'-anthrimide-carbazole. |
| 0.4 part of dibrom-8-azabenzanthrone-alpha-aminoanthraquinone. | 1 part of the brown vat dyestuff according to the first paragraph of the Example of the U. S. Patent 1,804,538 and 0.2 part of 5.5'-di(benzoylamino)-1.1'-anthrimide-carbazole. |
| 3.75 parts of 8-azabenzanthrone-alpha-aminoanthraquinone. | 4 parts of Algol Orange RF (Schultz Farbstoff-Tabellen, 7th edition, No. 1349). |
| 1.8 parts of 8-azabenzanthrone-alpha-aminoanthraquinone. | 18 parts of the yellow dyestuff obtainable according to the Example 4 of the U. S. Patent No. 1,748,240. |
| 3 parts of 8-azabenzanthrone-alpha-aminoanthraquinone. | 3.5 parts of Indanthrene Red Violet RH (Schultz Farbstoff-Tabellen, 7th edition, No. 1354) |
| 3.5 parts of 6-anthraquinonyl-amino-8-azabenzanthrone-alpha-aminoanthraquinone. | 1.5 parts of the dyestuff employed in Example 1 of this application. |
| 3.5 parts of 6-anthraquinonyl-amino-8-azabenzanthrone-alpha-aminoanthraquinone. | 5 parts of Indanthrene Gold Orange G (Schultz Farbstoff-Tabellen, 7th edition, No. 1245). |
| 2.5 parts of 8-azabenzanthrone-alpha-aminoanthraquinone. | 6 parts of Anthra Red RT (Schultz Farbstoff-Tabellen, 7th edition, No. 1254). |
| 5 parts of 8-azabenzanthrone-alpha-aminoanthraquinone. | 7.5 parts of Indanthrene Brilliant Violet RR (Schultz Farbstoff-Tabellen, 7th edition, No 1265). |
| 3 parts of Bz3-azabenzanthrone-alpha-aminoanthraquinone. | 2 parts of Indanthrene Brilliant Pink R (Schultz Farbstoff-Tabellen, 7th edition, No. 1345). |
| 2.5 parts of 8-azabenzanthrone-alpha-aminoanthraquinone. | 7.5 parts of Indanthrene Currant RK (Schultz Farbstoff-Tabellen, 7th edition, No. 1226). |
| 0.5 part of dibrom-8-azabenzanthrone-alpha-aminoanthraquinone. | 3 parts of Indanthrene Brown R (Schultz Farbstoff-Tabellen, 7th edition, No. 1227). |
| 1.2 parts of 7-methyl-8-azabenzanthrone-alpha-aminoanthraquinone. | 4 parts of Indanthrene Orange RRK (Schultz Farbstoff-Tabellen, 7th edition, No. 1225). |
| 0.8 part of 8-azabenzanthrone-alpha-methylaminoanthraquinone. | 2.3 parts of Indanthrene Brown R (Schultz Farbstoff-Tabellen, 7th edition, No. 1227) and 2.5 parts of Indanthrene Olive R (Schultz Farbstoff-Tabellen, 7th edition, No. 1224). |
| 5 parts of 8-azabenzanthrone-alpha-aminoanthraquinone. | 5 parts of Hydrone Blue B (Schultz Farbstoff-Tabellen, 7th edition, No. 1113). |
| 4 parts of 8-azabenzanthrone-alpha-aminoanthraquinone. | 7.5 parts of the brown vat dyestuff obtainable according to the German patent No. 241,910, page 3, line 14. |
| 5.5 parts of Bz3-azabenzanthrone-alpha-aminoanthraquinone. | 3.2 parts of the yellow vat dyestuff obtainable according to the 2nd paragraph of Example 1 of the German Patent No. 251,350. |
| 5.4 parts of 8-azabenzanthrone-alpha-aminoanthraquinone. | 4 parts of the blue vat dyestuff according to Example 1 of the U. S. Patent No. 1,207,982. |
| 5 parts of 8-azabenzanthrone-alpha-aminoanthraquinone. | 4 parts of the black vat dyestuff according to the U. S. Patent No. 1,452,805. |
| 5 parts of 8-azabenzanthrone-pyrazolanthrone. | 3 parts of Indanthrene Brilliant Pink R (Schultz Farbstoff-Tabellen, 7th edition, No. 1345). |

What I claim is:

1. Dyestuff mixtures containing an azabenzanthrone-alpha-aminoanthraquinone and at least one other organic dyestuff the latter being insensitive to reducing agents.

2. Dyestuff mixtures containing an azabenzanthrone-alpha-aminoanthraquinone and at least one other vat dyestuff.

3. Dyestuff mixtures containing at least one dyestuff of the azabenzanthrone series which contains at least one acridine ring beside the azabenzanthrone part of the molecule selected from the group consisting of azabenzanthrone-alpha-aminoanthraquinones, their homologues and halogen derivatives and at least one other organic dyestuff the latter being insensitive to reducing agents.

4. Dyestuff mixtures containing at least one dyestuff of the azabenzanthrone series which contains at least one acridine ring beside the azabenzanthrone part of the molecule selected from the group consisting of azabenzanthrone-alpha-aminoanthraquinones, their homologues and halogen derivatives and at least one other vat dyestuff.

5. Dyestuff mixtures containing an azabenzanthrone-alpha-aminoanthraquinone which may be halogenated, and anthraquinonediphenyldithiazole which corresponds to the formula:

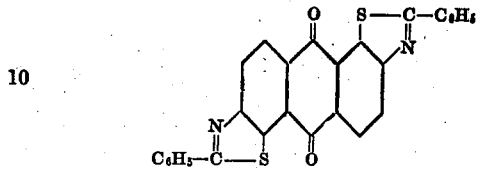

6. Dyestuff mixtures containing an azabenzanthrone-alpha-aminoanthraquinone which may be halogenated, and the dyestuff corresponding to the formula:

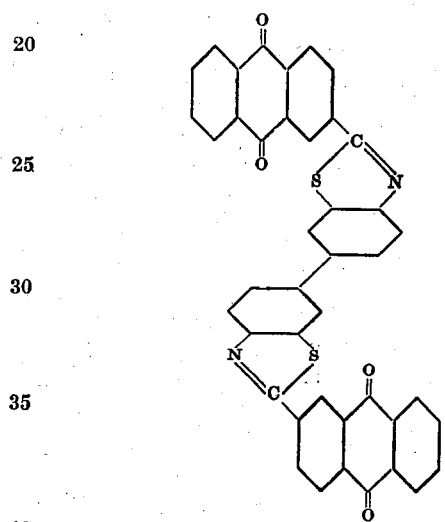

7. Dyestuff mixtures containing an azabenzanthrone-alpha-aminoanthraquinone which may be halogenated, and the dyestuff corresponding to the formula:

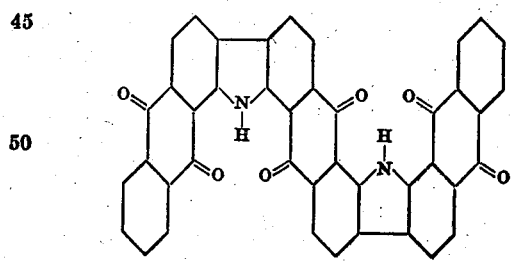

8. The dyestuff mixture containing 8-azabenzanthrone-alpha-aminoanthraquinone and anthraquinonediphenylthiazole.

9. The dyestuff mixture containing 8-azabenzanthrone-alpha-aminoanthraquinone and the dyestuff corresponding to the formula:

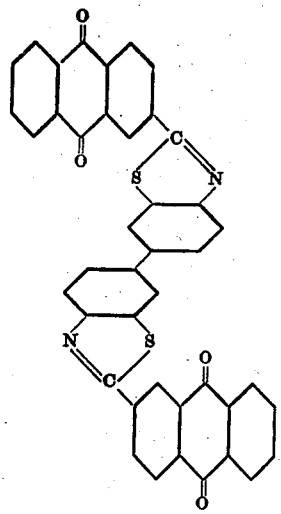

10. The dyestuff mixture containing 8-azabenzanthrone-alpha-aminoanthraquinone and the dyestuff corresponding to the formula:

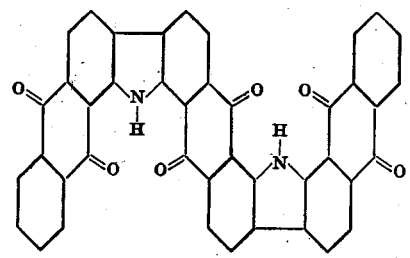

JOACHIM MUELLER.